United States Patent
Eltvedt

[19]

[11] Patent Number: 5,947,264
[45] Date of Patent: Sep. 7, 1999

[54] CONVEYOR BELT TENSIONER AND GUIDE

[75] Inventor: Frank A. Eltvedt, Crystal Lake, Ill.

[73] Assignee: Molding Automatic Concepts, Inc., Ill.

[21] Appl. No.: 09/084,284

[22] Filed: May 26, 1998

Related U.S. Application Data

[63] Continuation of application No. 08/854,360, May 12, 1997, abandoned.

[51] Int. Cl.[6] .................................................. B65G 23/44
[52] U.S. Cl. .......................................... 198/816; 198/841
[58] Field of Search .................................. 198/816, 813, 198/835, 837, 841

[56] References Cited

U.S. PATENT DOCUMENTS

| | | |
|---|---|---|
| 1,692,832 | 11/1928 | Harrison . |
| 1,709,549 | 4/1929 | Webber . |
| 2,375,065 | 5/1945 | Askue . |
| 2,386,619 | 10/1945 | Long et al. ............................. 198/816 |
| 3,035,685 | 5/1962 | Raynor . |
| 3,718,197 | 2/1973 | Barten . |
| 3,921,793 | 11/1975 | Hutchinson ......................... 198/816 X |
| 5,096,045 | 3/1992 | Feldl ...................................... 198/583 |
| 5,593,019 | 1/1997 | Schlagel ............................. 198/841 X |

FOREIGN PATENT DOCUMENTS 87176510  11/1986  U.S.S.R. .

OTHER PUBLICATIONS

Habasit guiding profiles MAC Adjustable Angle Conveyors.

*Primary Examiner*—James R. Bidwell
*Attorney, Agent, or Firm*—Patnaude & Videbeck

[57] ABSTRACT

An improved conveyor belt tensioner, accessible from the top of the conveyor has a push block which slides along an angled guide to apply force between the take up member and the frame of the conveyor. Also, a guide which is laterally movable along a cross support between the frame of the conveyor is provided to adjust the centering of the belt between the frame members.

13 Claims, 4 Drawing Sheets

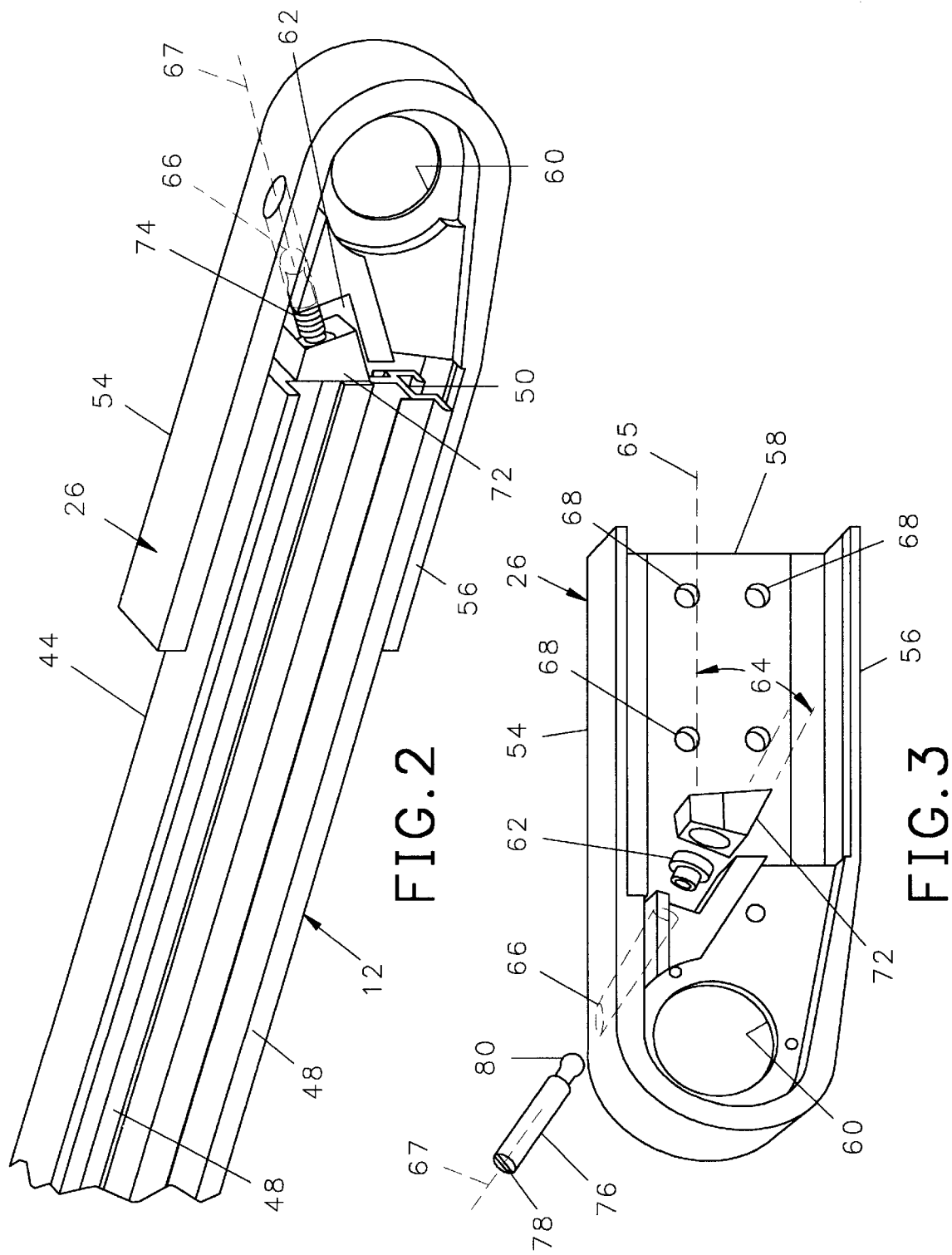

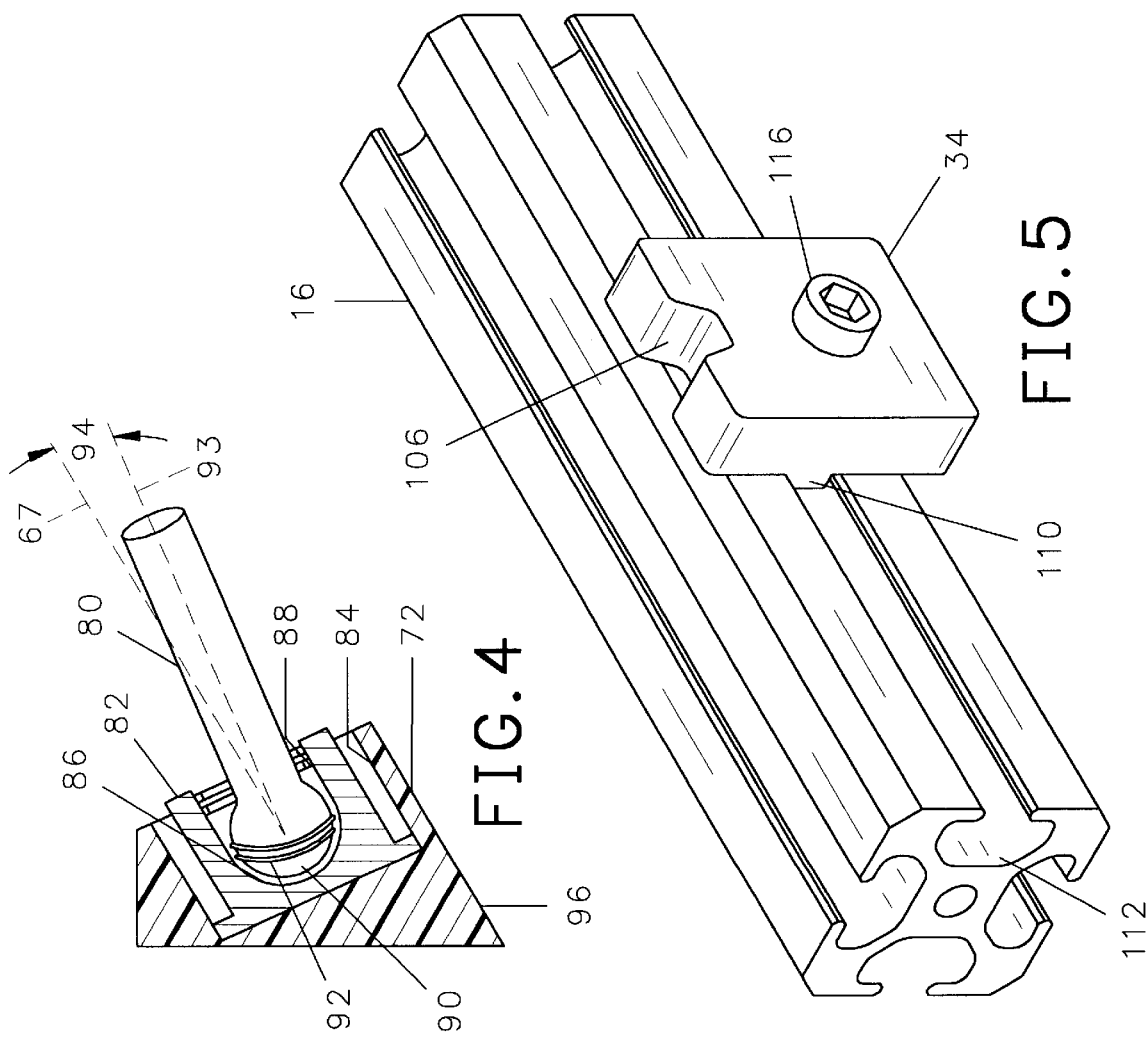

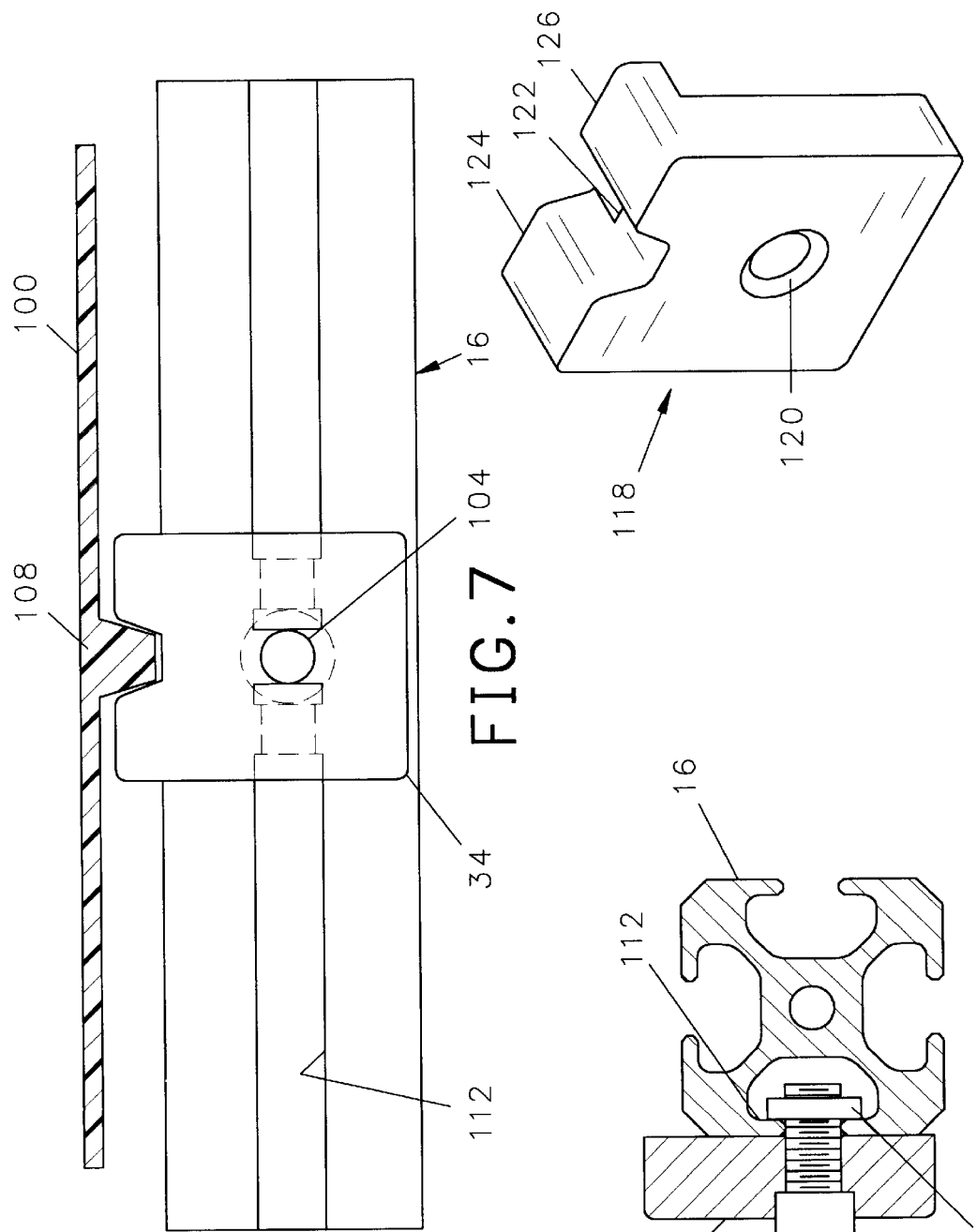

CONVEYOR BELT TENSIONER AND GUIDE

This application is a continuation of Ser. No. 08/854,360 filed on May 12, 1997, now abandoned.

The present invention relates to conveyor belts and in particular to an accessible tensioner for tightening a conveyor belt and to a guide for aligning the belt of a conveyor along the center of a conveyor frame.

BACKGROUND OF THE INVENTION

Conveyors having moving belts which extend around rollers are frequently constructed such that the distal end of the conveyor is positioned immediately adjacent another piece of equipment, or a second conveyor, with a minimum of space between the distal end of the conveyor and the succeeding process or conveyor. For the smooth operation of such a conveyor, periodic adjustments are required to take up slack in the belt. The manufacturers of existing conveyor belts, however, provide that the tensioner is adjusted from the distal end of the conveyor assembly. The adjustment of existing tensioners requires that one turn a takeup screw positioned below the distal end of the conveyor belt. However, where the distal end of the conveyor belt abuts a adjacent equipment, or a second conveyor, that equipment may block access to the takeup screws. Under such circumstances, a technician may have to disassemble surrounding equipment to adjust the tension of a conveyor belt.

The operation of the conveyor requires not only that slack be taken up, but that the belt be moved longitudinally between the parallel frame members which support the rollers along which the belt moves. Movement of the belt to either side of the rollers will cause damage to the belt and reduce the efficiency of the conveyor. To ensure that a conveyor belt will remain centered along the conveyor, and not shift to one side, it is well known to provide protrusions along the inner surface of the belt and a track between the frame members such that the protrusion can move within the track under the belt, such as shown in U.S. Pat. No. 1,692,832, to provide centering of the belt.

In most circumstances, the provision of a protrusion along the lower surface of a belt and a track down the center of the frame is sufficient to maintain the alignment of a belt. There are circumstances, however, when lateral forces are applied to the belt causing the belt to shift as far to one side of the frame as the protrusions and the groove configuration will permit thereby causing the belt to be off center. Such misalignment can reduce the effectiveness of the conveyor.

It would be desirable, therefore, to provide a tensioner for a conveyor which is accessible from above the frame such that it can be adjusted without requiring that the adjacent equipment be disassembled. It would also be desirable to provide a guide for a conveyor belt which can be laterally adjusted to compensate for lateral forces.

SUMMARY OF THE INVENTION

Briefly, the present invention is embodied in a conveyor belt tensioner for a conveyor having parallel frame members between which are supported a plurality of rollers. Such conveyors have a takeup member slidably mounted on the distal end of the frames for movement in a first direction relative to the frame. A roller is rotatably mounted between the takeup members such that movement of the takeup members moves the roller to tighten or loosen the belt wrapped around the rollers of the conveyor.

In accordance with the present invention, an improved tensioner is provided for adjustably moving the takeup members with respect to the frame members to thereby alter the tension within the conveyor belt. The improved tensioner includes a push block having a push surface and rotatably attached to the push block is a threaded adjustment screw. In the preferred embodiment, the attachment of the adjustment screw to the push block includes a ball socket having a threaded annular mouth. The distal end of the threaded adjustment screw has a ball, with the outer surface of the ball threaded complementary to the threads of the mouth of the ball socket. Accordingly, the ball of the adjustment screw can be threaded through the mouth and into the socket. When the ball has been threaded beyond the threads of the mouth, the ball will be free to pivot within the socket and to rotate around the axis of the screw.

An angled threaded bore is provided in either the frame or the takeup member into which the threaded takeup screw is inserted. A surface is provided on the other of the frame or the takeup member against which the push surface of the push block is positioned. The rotation of the takeup screw will then apply pressure through the push block to longitudinally adjust the takeup member with respect to the frame member.

In accordance with the preferred embodiment, the member having the threaded hole for receiving the takeup screw further has a longitudinal guide oriented parallel to the axis of the takeup screw for guiding movement of the push block. The guide may be a ramped surface along which the push block is slidable. Preferably, the adjustment screw and guide are aligned at approximately 30 degrees to the longitudinal axis of the frame.

To ensure that the threaded ball does not thread itself out of the socket while the adjustment screw is being turned, the axis of the threads in the mouth of the socket is aligned at a five degree angle with respect to the axis of the adjustment screw when the push block is positioned on the guide. Also, the ball and complementary threaded mouth are provided with reverse threads. Therefore, when the threaded screw is being turned counterclockwise, to draw the push block away from the surface of the opposing member, the ball cannot unthread through the mouth.

The conveyor has parallel frame members joined by a plurality of cross members, each of which has an adjustable guide member slidably mounted thereto. Each of the guide members has an upper surface with an indentation therein, such that the indentations can be aligned with each other to form a track. By adjusting the guide members, the track can be positioned off the center line between the frame members.

Extending longitudinally along the lower surface of the conveyor belt is a ridge having a cross sectional shape complementary to the cross sectional shape of the ridge along the lower surface of the belt. The ridge of the belt will be received in the indentations of the guides to provide centering along the conveyor. If a transverse load is applied to the conveyor the guides can be laterally adjusted to maintain the centering of the conveyor belt between the frame members.

BRIEF DESCRIPTION OF THE DRAWINGS

A better understanding of the present invention will be had by a reading of the following detailed description taken in conjunction with the accompanying drawings wherein:

FIG. 2 is an enlarged isometric view of the distal end of one frame member and an attached tensioner for the conveyor shown in FIG. 1;

FIG. 3 is an enlarged exploded isometric view of the tensioner member and components shown in FIG. 2;

FIG. 4 is an enlarged cross-sectional view of the end of the takeup screw fitted into the socket of the push block shown in FIG. 3;

FIG. 5 is an isometric view of one of the cross members for the conveyor shown in FIG. 1 with a laterally adjustable guide attached thereto;

FIG. 6 is a side view of the guide shown in FIG. 5;

FIG. 7 is a plan view of the cross member and guide shown in FIG. 5 and a cross sectional view of the conveyor belt engaged with the guide;

FIG. 8 is a side cross sectional view of the guide and cross member shown in FIG. 5;

FIG. 9 is a perspective view of a second embodiment of the longitudinally adjustable guide of the invention.

DETAILED DESCRIPTION OF THE PREFERRED EMBODIMENT

Figure 1:
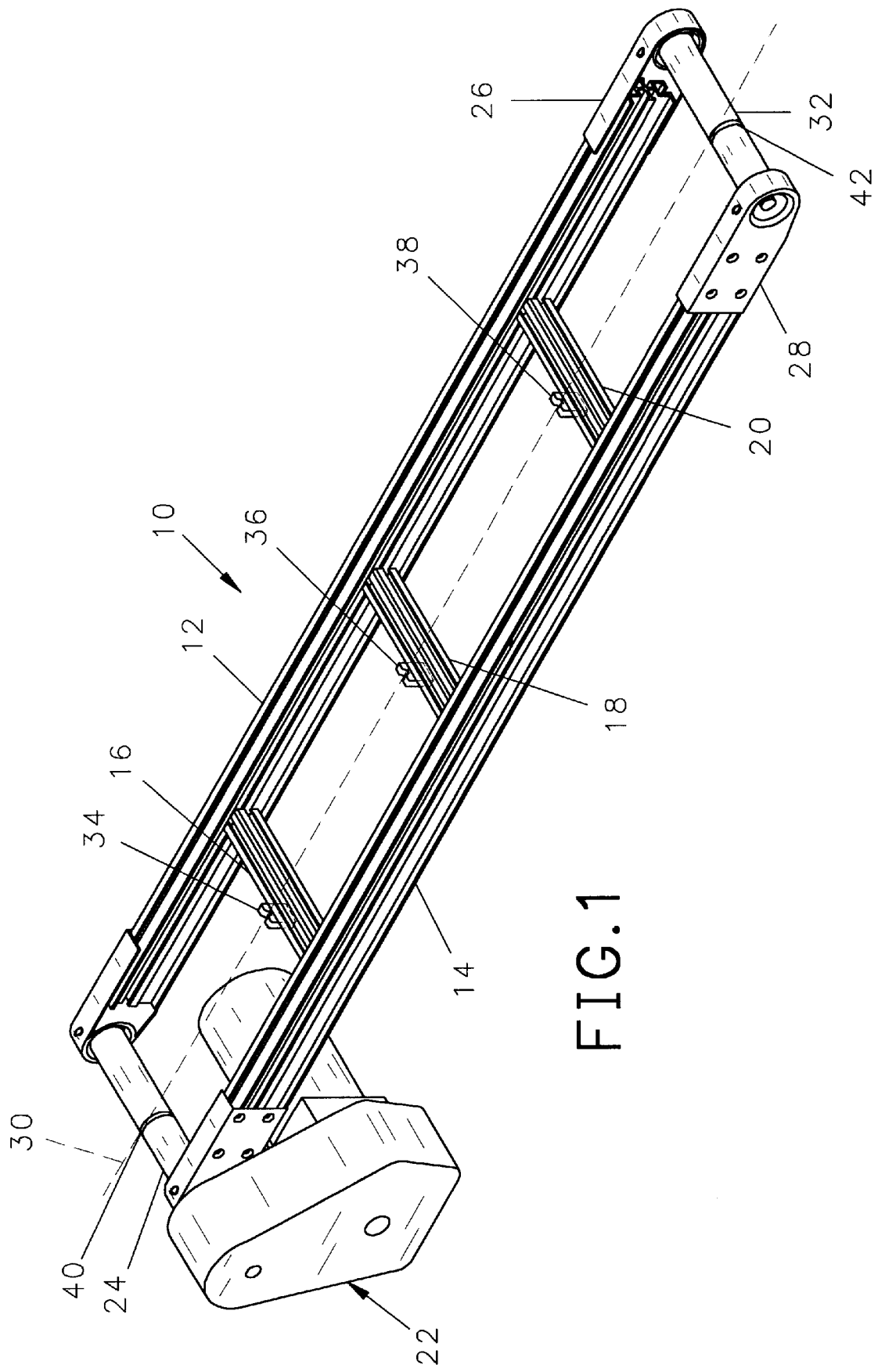
FIG. 1 is an isometric transparent view of a conveyor constructed in accordance with the present invention with the belt removed to show the interior parts thereof.

Referring to FIG. 1, a conveyor 10 is defined by parallel frame members 12, 14, which are maintained in proper alignment by cross members 16, 18, 20. At the inner end of the conveyor 10 is a motorized drive assembly 22 which is drivingly engaged with a drive roller 24. At the distal ends of the frame members 12, 14 are takeup members 26, 28, respectively, each of which is adapted to slide longitudinally and parallel to the axis 30 of the conveyor. Extending between the takeup members 26, 28, is a takeup roller 32.

Positioned midway along each of the cross members 16, 18, 20 are guide blocks 34, 36, 38 as further described below. Also, centrally located around the circumference of the drive roller 24 and the takeup roller 32 are annular grooves 40, 42, respectively for receiving a protrusion along the inner surface of a conveyor belt, not shown. To adjust the tension of a belt fitted over the rollers 24, 32, the takeup members 26, 28 are adjusted longitudinally, that is, in a direction parallel with the axis 30 of the conveyor 10.

Referring to FIGS. 2, 3 and 4, the takeup members 26, 28 are mirror images of each other and, except for the direction of the threading of screws and the like. The frame member 12 is typically made of an extruded metal, such as aluminum, and has a generally planar upper surface 44, a generally planar lower surface, not visible, and a plurality of longitudinal grooves 48, 48, extruded into the length thereof. The distal end 50 of the frame member 12 defines a plane generally perpendicular to the axis 30 of the conveyor 10. Fitted around the distal end 50 of the frame member 12 is a cast aluminum takeup member 26. The takeup member 26 has upper and lower plates 54, 56, respectively, between which extends a vertically oriented web 58. Near the distal end of the takeup member 26 is a circular transverse hole 60 for receiving the outer end and bearing of a takeup roller 32. The inner surfaces of the upper and lower plates 54, 56 are spaced apart a distance a little greater than the height of the frame member 12 such that the takeup member 26 will fit slidably around the distal end of the frame member 12.

Cast into the inner surface of the takeup member 26 is a ramp surface 62 which is perpendicular to the web 58 and is oriented at an angle 64 with a line 65 parallel to the axis 30 of the conveyor 10 which is approximately 30 degrees. Extending through the upper plate 54, parallel to the ramp surface 62 and parallel to the web 58 is a threaded bore 66 having an axis 67. Finally, extending through the web 58 are a plurality of transverse holes 68—68 for receiving screws which can be threaded into nuts, not shown, retained in grooves 48 in the outer surface of the frame member 12 to retain the takeup member 26 with respect to the frame member 12 against relative movement between the parts.

As best shown in FIGS. 2 and 3, to adjust the takeup of the conveyor, a push block 72 is fitted against the distal end 50 of the frame member 12 and rotatably attached to the push block 72 is a takeup screw 74. As best shown in FIG. 3, the takeup screw 74 has a cylindrical threaded body 76, an inner end 78 having a hexagon recess therein for receiving the end of an allen wrench, and a distal end 80.

As best shown in FIGS. 3 and 4, the push block 72 may be made of any suitable material, including molded plastic, and has a central opening for receiving a mounting member 82 therein, which is secured by any appropriate means such as an adhesive. The mounting member 82 is preferably made of metal, the outer surfaces of which are sized to be received in the opening 84 of the push block 72 and the inner portions of which define a ball socket 86 having an annular mouth 88 with threadings therein. The distal end 80 of the takeup screw 74 includes a ball 90 with threadings 92 on the outer surface thereof which are complementary to the threadings of the mouth 88 in the mounting member 82.

In the preferred embodiment, the threadings around the ball 90 and within the mouth 88 are reversed whereas the threadings of the body 76 and the bore 66 of the takeup screw are conventional. Also, as best shown in FIG. 4, the axis 93 of the threadings of the mouth 88 and, therefore, the orientation of the ball socket 86 is at an angle 94 which is at least five degrees away from the axis 67 of the thread bore 66 when the lower surface 96 of the push block is fitted against the ramp surface 62. As a result of the foregoing, the ball 90 can be threaded through the annular mouth 88 and into the ball socket 86 as shown. Once the ball 90 is inserted into the socket 86 and the lower surface 96 of the push block 22 is positioned on the ramp surface 62, the threadings of the ball 90 will be misoriented with respect to the threadings of the mouth 88, and the ball 90 cannot be withdrawn or unthreaded from the socket 86. Even if the two parts were aligned, the reverse threadings of the ball 90 and mouth 88 would prevent the ball 90 from becoming threaded through mouth 88 while the screw 74 is being turned to withdraw the push block 72.

To adjust the tension of a belt extending around the conveyor, the side bolts extending into holes 68—68 retaining the takeup members 26, 28 to the frame members 12, 14 are loosened such that the takeup members 26, 28 may be longitudinally adjusted by rotation of the adjustment screws 74. Thereafter, an allen wrench or the like is used to rotate the adjustment screws which are reachable from the upper surface of the conveyor as shown. Rotation of the adjustment screws will force the push block 72 outward along the ramp surface 62 or retract the push block 72 inward along the surface, thereby allowing the takeup members 26, 28 to be adjusted longitudinally with respect to the frame members 12, 14. After the parts have been properly adjusted, the side bolts may again be tightened to retain the takeup members to the frame members.

Referring to FIGS. 5, 6, 7 and 8, to retain a belt 100 midway between the frame members 12, 14 when the belt is subjected to lateral forces, guide blocks 34, 36, 38 are provided on each of the cross members 16, 18, 20 of which the guide block 34 on cross member 16 is representative.

Each of the guide members 34 has a generally rectangular shaped body through which a central transverse hole 104 is positioned. At the upper end of the body is a groove 106 contoured to receive a longitudinal protrusion 108 in the lower surface of the conveyor belt 100. Extending horizontally across the rear side of the guide member 34 is a centrally located rib 110.

The cross members 16 of the conveyor are provided with longitudinal grooves 112 for slidably receiving a nut 114 into which a screw 116 can be threaded. The guide member 34 is secured to the cross member 16 by inserting the rib 110 on the rear side thereof into the groove 112 and threading the screw 116 through the hole 104 and into a nut retained within the groove 112. As can be seen, if transverse forces applied to the belt 110 cause it to be shifted towards one of the frame members 12, 14, the guide blocks 34, 36, 38 can be adjusted laterally by loosening the associated screw 116 and sliding the blocks along the cross members 16, 18, 20 to a suitable position to compensate for the transverse forces. Thereafter, the screw 116 can be tightened. The protrusion 108 of the belt 110 within the grooves 106 of the guide blocks will thereafter maintain the desired positioning of the belt between the frame members 12, 14.

Referring to FIG. 9, a second embodiment of the longitudinally adjustable guide block is shown at 118. Like the first embodiment, it includes a generally rectangular body having a central transverse aperture 120 therethrough. A top central groove 122 on guide block 118 performs the same function as groove 106 on guide block 34. However, guide block 118 includes groove shoulders 124, 126 that extend partly over the top of cross member 16 to give added strength to the block.

While two embodiments of the present invention have been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. In a conveyor belt tensioner for a conveyor, said conveyor having parallel frame members for supporting a plurality of rollers therebetween, each of said frame members having an upper surface and having a tensioner slidably mounted thereon for movement in a first direction relative to said frame member, a roller rotatably mounted between said tensioners, and an adjustment means between each of said frame member and said tensioner for adjustably moving said tensioner with respect to said frame member and thereby altering the tension in a conveyor belt extending along said frame and over said roller, the improvement comprising,
   a push block having a push surface,
   an adjustment screw having a threaded central portion, a first end and a second end,
   means to rotatably retain said first end of said adjusting screw to said push block,
   rotating means on said second end of said adjusting screw for rotating said screw about its longitudinal axis,
   said adjusting screw threaded through a threaded retaining hole in one of said frame member and said tensioner,
   a surface on the other of said frame member and said tensioner, said surface having a component perpendicular to said first direction,
   and said push surface of said push block positioned against said surface whereby said adjusting screw can be rotated by said rotating means to axially move said push block against said surface to thereby alter tension in said conveyor belt.

2. The improvement according to claim 1 wherein said threaded retaining hole has a principal longitudinal axis which is oriented at an angle with said first direction.

3. The improvement according to claim 1 and further comprising,
   a longitudinal guide on said one of said frame member and said tensioner, said guide parallel to the principal longitudinal axis of said threaded retaining hole.

4. The improvement of claim 1 and further comprising,
   a ball socket in said push block, said ball socket having a mouth, and
   a ball on a distal end of said adjusting screw.

5. The improvement of claim 4 and further comprising,
   threadings in said mouth of said ball socket and,
   threading around a circumference of said ball, said threadings of said ball being complementary to said threadings in said mouth.

6. The improvement of claim 5 wherein said socket and said mouth has a first axis and said threaded retaining hole has a second axis and said first axis and said second axis are angled with respect to one another by at least five degrees.

7. The improvement of claim 6 wherein said axis of said retaining hole is oriented at an angle with said first direction.

8. The improvement of claim 7 and further comprising a longitudinal guide on said one of said frame member and said tensioner, said guide parallel to said longitudinal axis of said threaded retaining hole.

9. The improvement of claim 8 and further comprising,
   a cross support extending between said parallel frame members,
   said cross support having a longitudinal track therein,
   a guide member laterally movably attached to said cross support,
   said guide member having a groove therein,
   a conveyor belt extending around said rollers between said frame members, and
   a ridge on a lower surface of said belt whereby the alignment of said belt between said frame members is laterally adjustable by laterally moving said guide member along said cross support.

10. In a conveyor having parallel frame members for supporting a plurality of rollers therebetween and a movable conveyor belt around said rollers, the improvement comprising,
    a cross support extending between said parallel frame members,
    said belt having a lower surface,
    a guide member,
    retaining means on said guide member and said cross support for retaining said guide member to said cross support for lateral movement therealong,
    locking means for locking said guide member against lateral movement,
    a groove on one of said lower surface of said belt and said guide means, and
    a protrusion on the other of said lower surface of said belt and said guide member, said protrusion sized to be received in said groove whereby said belt can be laterally centered between said parallel guide members by moving said guide laterally along said cross support and locking it in place.

11. The improvement of claim 10 and further comprising a plurality of cross supports and a guide member mounted on each of said cross supports.

12. The improvement of claim 10 wherein said retaining means includes a groove along the length of said cross support.

13. The improvement of claim 12 wherein said locking means includes a bolt and nut, wherein one of said bolt and said nut is retained in said groove.

* * * * *